United States Patent

Echigoya et al.

[11] Patent Number: 5,971,845
[45] Date of Patent: Oct. 26, 1999

[54] METHOD AND APPARATUS FOR CONTROLLING VEHICULAR DEFROSTER

[75] Inventors: Hiroshi Echigoya; Hiroshi Iwami, both of Utsunomiya, Japan

[73] Assignee: Honda Giken Kogyo Kabushiki Kaisha, Tokyo, Japan

[21] Appl. No.: 09/069,151

[22] Filed: Apr. 29, 1998

[30] Foreign Application Priority Data

Apr. 30, 1997 [JP] Japan .................................. 9-112093

[51] Int. Cl.[6] ...................................................... B60S 1/54
[52] U.S. Cl. ............................................. 454/121; 454/75
[58] Field of Search .............................. 454/75, 121, 127; 219/203; 165/291

[56] References Cited

U.S. PATENT DOCUMENTS 5,296,678  3/1994  Schnorf ................................... 219/203
5,501,267  3/1996  Iritani et al. .............................. 165/29
5,685,162  11/1997 Iritani et al. .............................. 62/156

*Primary Examiner*—Harold Joyce
*Attorney, Agent, or Firm*—Birch, Stewart, Kolasch & Birch, LLP.

[57] ABSTRACT

A vehicular defroster control system comprising a single defroster selector switch for alternatively operating the air-conditioning defroster only or both the air-conditioning defroster and the electric heat-operated defroster, an environmental condition input unit for inputting environmental conditions including at least an ambient air temperature and a sunlight intensity, and an operation control means for judging whether or not the inputted ambient air temperature and the sunlight intensity are lower than previously set predetermined values, and operating the electric heat-operated defroster only when it is judged that both of the inputted ambient air temperature and the sunlight intensity are lower than the predetermined values.

9 Claims, 9 Drawing Sheets

METHOD AND APPARATUS FOR CONTROLLING VEHICULAR DEFROSTER

BACKGROUND OF THE INVENTION

1. Field of the Invention

The present invention relates to a method and an apparatus for controlling a vehicular defroster for operating and controlling an air-conditioning defroster for discharging air-conditioned air against a windshield glass, and an electric heat-operated defroster having a heating wire embedded in the windshield glass.

2. Description of the Related Art

In general, the vehicular defroster is provided with an air-conditioning defroster for performing defogging by discharging air-conditioned air against a windshield glass, and an electric heat-operated defroster for performing defogging by using a heating wire embedded in the windshield glass.

The air-conditioning defroster is generally operated by manipulating an outlet selector switch provided on an air-conditioner control panel so that the air outlet mode in the passenger's compartment is changed to the "DEF" mode or the "FOOT/DEF" mode. On the other hand, the electric heat-operated defroster includes an exclusive on/off selector switch which is individually designed separately from the air-conditioning system.

However, the conventional vehicular defroster as described above individually includes the two means, i.e., the air-conditioning defroster and the electric heat-operated defroster which have the identical function to perform defogging for the windshield glass in order to ensure the frontward view from the passenger's compartment. Therefore, the passenger selectively operates the air-conditioning defroster and the electric heat-operated defroster. As a result, the operation to perform "defogging" is considerably complicated.

It is premised in the conventional vehicular defroster that the electric heat-operated defroster provided in the windshield glass is used when the ambient air temperature is relatively low, because of the following reason. That is, if the electric heat-operated defroster is operated at a temperature not less than a certain temperature, the windshield glass is distorted, or the windshield glass tends to be broken. Therefore, a problem is pointed out that it is complicated to manage the operation of the electric heat-operated defroster.

SUMMARY OF THE INVENTION

A principal object of the present invention is to provide a method and an apparatus for controlling a vehicular defroster, which make it possible to simplify the structure and reliably obtain the defogging function for a windshield glass based on a simple operation.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
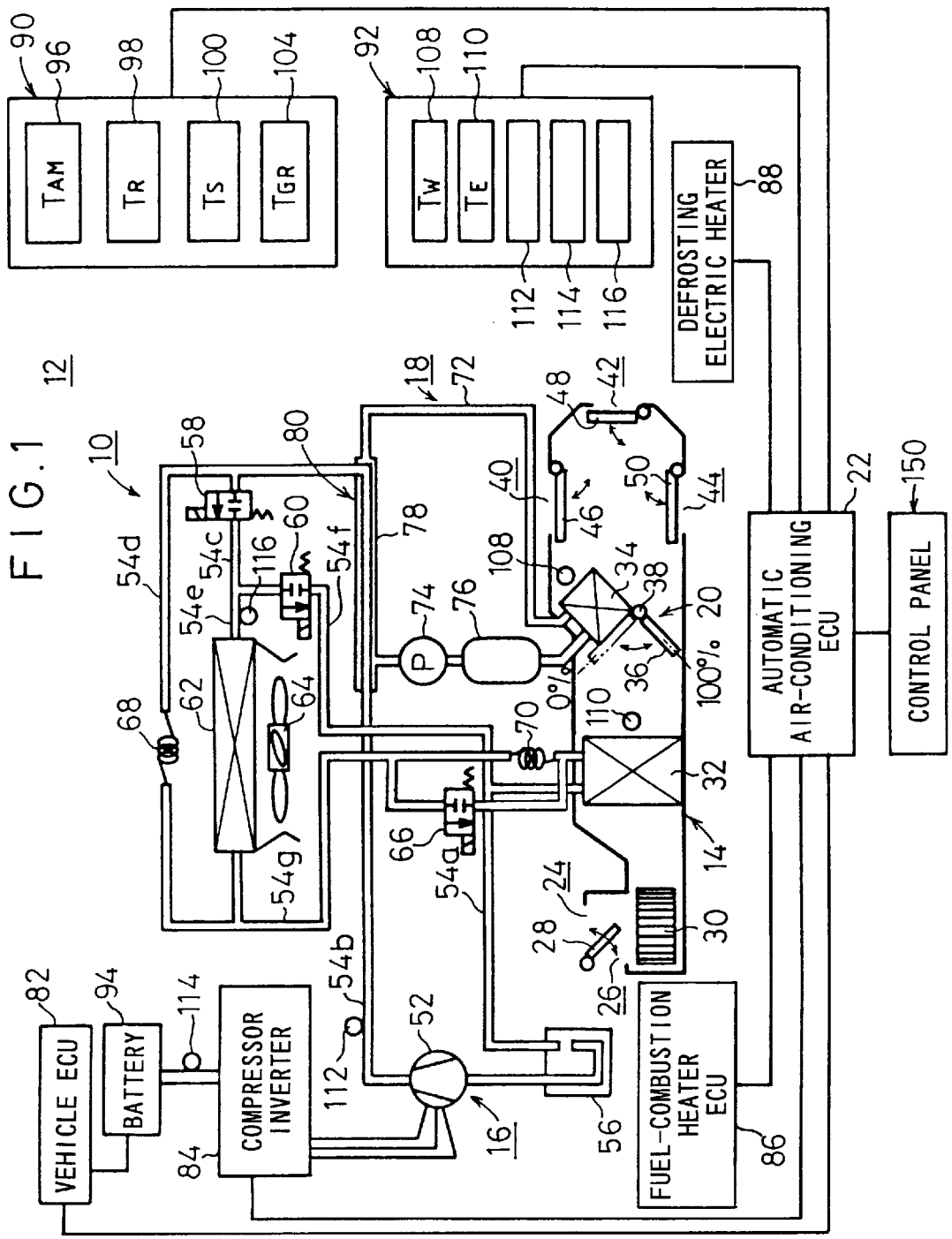
FIG. 1 is a schematic view, partly in block form, of an automatic air-conditioning system for use on an electric vehicle, into which a defroster control apparatus according to the present invention is incorporated.

FIG. 1 schematically shows, partly in block form, an automatic air-conditioning system 12 for use on an electric vehicle, into which a control apparatus 10 according to the present invention is incorporated.

As shown in FIG. 1, the automatic air-conditioning system 12 has a duct 14 for discharging temperature-controlled and humidity-controlled air into the passenger's compartment of the electric vehicle, a cooling medium circuit 16 for cooling the air flowing through the duct 14 through heat exchange between the air and a coolant, a heating medium circuit 18 for heating the air flowing through the duct 14 through heat exchange between the air and hot water, an air-mixing unit 20 disposed in the duct 14 for mixing and controlling cool air and hot air, and an automatic air-conditioning ECU 22 for controlling operation of various units including the air-mixing unit 20.

The duct 14 is disposed in front of the passenger's compartment with an instrumental panel (not shown) interposed therebetween. The duct 14 has on its upstream end an interior air inlet 24 for introducing air from an interior space in the passenger's compartment and an exterior air inlet 26 for introducing from an exterior space outside of the passenger's compartment, the interior air inlet 24 and the exterior air inlet 26 being selectively openable and closable by a switching damper 28.

In the duct 14, there are disposed an air blower 30 closely to the switching damper 28 and an evaporator 32 positioned downstream of the air blower 30, the evaporator 32 being part of the cooling medium circuit 16. The duct 14 also houses therein a heater core 34 disposed downstream of the evaporator 32, the heater core 34 being part of the heating medium circuit 18. The air-mixing unit 20 is mounted on an inlet side of the heater core 34. The air-mixing unit 20 has an air-mixing damper 36 which can be angularly moved to any desired angular position within an angular range from an angular extent 0% to an angular extent 100% by an air-mixing motor 38 coupled to the air-mixing damper 36.

The duct 14 has in its downstream end portion a defrosting outlet 40 which is part of an air-conditioning defroster, for discharging air against the inner surface of a front windshield of the electric vehicle, a face outlet 42 for discharging air against the head of a passenger in the passenger's compartment, and a foot outlet 44 for discharging air against the feet of the passenger. The defrosting outlet 40, the face outlet 42, and the foot outlet 44 are associated respectively with a defrosting damper 46, a face damper 48, and a foot damper 50 which are angularly movable to open and close the defrosting outlet 40, the face outlet 42, and the foot outlet 44, respectively.

These outlets 40, 42, 44 operate selectively in various modes including a "DEF" mode in which the defrosting outlet 40 is selectively opened and closed by the defrosting damper 46, a "FOOT" mode in which the foot outlet 44 is selectively opened and closed by the foot damper 50, a "FOOT/DEF" mode in which the defrosting outlet 40 and the foot outlet 44 are selectively opened and closed by the defrosting damper 46 and the foot damper 50, a "VENT" mode (or "FACE" mode) in which the face outlet 42 is selectively opened and closed by the face damper 48, and a "B/L" mode in which the face outlet 42 and the foot outlet 44 are selectively opened and closed by the face damper 48 and the foot damper 50.

The evaporator 32 serves to evaporate a cooling medium flowing into the evaporator 32 and also to cool air which is introduced into the duct 14 by the aid of the air blower 30, through heat exchange between the air and the cooling medium.

The cooling medium circuit 16 which includes the evaporator 32 includes a compressor 52 having an inlet port connected to an outlet port of the evaporator 32 by a cooling medium pipe 54a which has an accumulator 56. The compressor 52 compresses the cooling medium (gas coolant), drawn thereinto through the inlet port thereof, and it discharges a high-temperature, high-pressure cooling medium from an outlet port thereof into a cooling medium pipe 54b. The accumulator 56 separates the cooling medium into a liquid coolant and a gas coolant, and it supplies only the gas coolant to the compressor 52.

The cooling medium pipe 54b has an end portion branched into cooling medium pipes 54c, 54d, and the cooling medium pipe 54c is branched into cooling medium pipes 54e, 54f. The cooling medium pipe 54c has a first solenoid-operated valve 58, and the cooling medium pipe 54f has a second solenoid-operated valve 60. The cooling medium pipe 54f is connected to the cooling medium pipe 54a. The cooling medium pipe 54e has an exterior heat exchanger 62 which serves to evaporate a low-temperature, low-pressure cooling medium in a gas-liquid phase through heat exchange between the cooling medium and exterior air applied by an exterior fan 64 when the automatic air-conditioning system 12 operates in a heating mode to heat the passenger's compartment, and also to condense a high-temperature, high-pressure gas coolant into a liquid through heat exchange between the gas coolant and exterior air applied by the exterior fan 64 when the automatic air-conditioning system 12 operates in a cooling mode to cool the passenger's compartment.

The cooling medium pipe 54d has a first capillary tube 68 to be used for heating. The cooling medium pipes 54d, 54e are joined into a cooling medium pipe 54g which is connected to the inlet port of the evaporator 32. In the cooling medium pipe 54g, a third solenoid-operated valve 66 and a second capillary tube 70 used for cooling are provided in parallel to each other.

The heating medium circuit 18 includes a hot-water circulation pipe 72 for circulating and supplying hot water to the heater core 34, the hot-water circulation pipe 72 having a water pump 74 and a fuel-combustion heater 76 for generating heat by combusting a fuel. The fuel-combustion heater 76 is controlled in three modes, i.e., an igniting mode, a combustion ability switching mode (mode of normal heating operation), and an extinguishing mode. The hot-water circulation pipe 72 includes an outer conduit 78 disposed around and extending a certain length along a portion of the cooling medium pipe 54b of the cooling medium circuit 16. The cooling medium pipe 54b and the outer conduit 78 jointly provide a double-walled medium heat exchanger 80. When the high-temperature, high-pressure cooling medium discharged from the compressor 52 flows through the cooling medium pipe 54b, the medium heat exchanger 80 heats hot water flowing as a heating medium in the outer conduit 78 of the hot-water circulation pipe 72 through heat exchange between the heating medium and the cooling medium from the compressor 52.

To the automatic air-conditioning ECU 22, there are connected a vehicle ECU 82, a compressor inverter 84, a fuel-combustion heater ECU 86, an electric heat-operated defroster (defrosting electric heater) 88, an environmental condition input unit 90, and an operating condition input unit 92. The vehicle ECU 82 and the compressor inverter 84 are supplied with electric energy from a battery 94, and the compressor inverter 84 is connected to the compressor 52.

Figure 2:
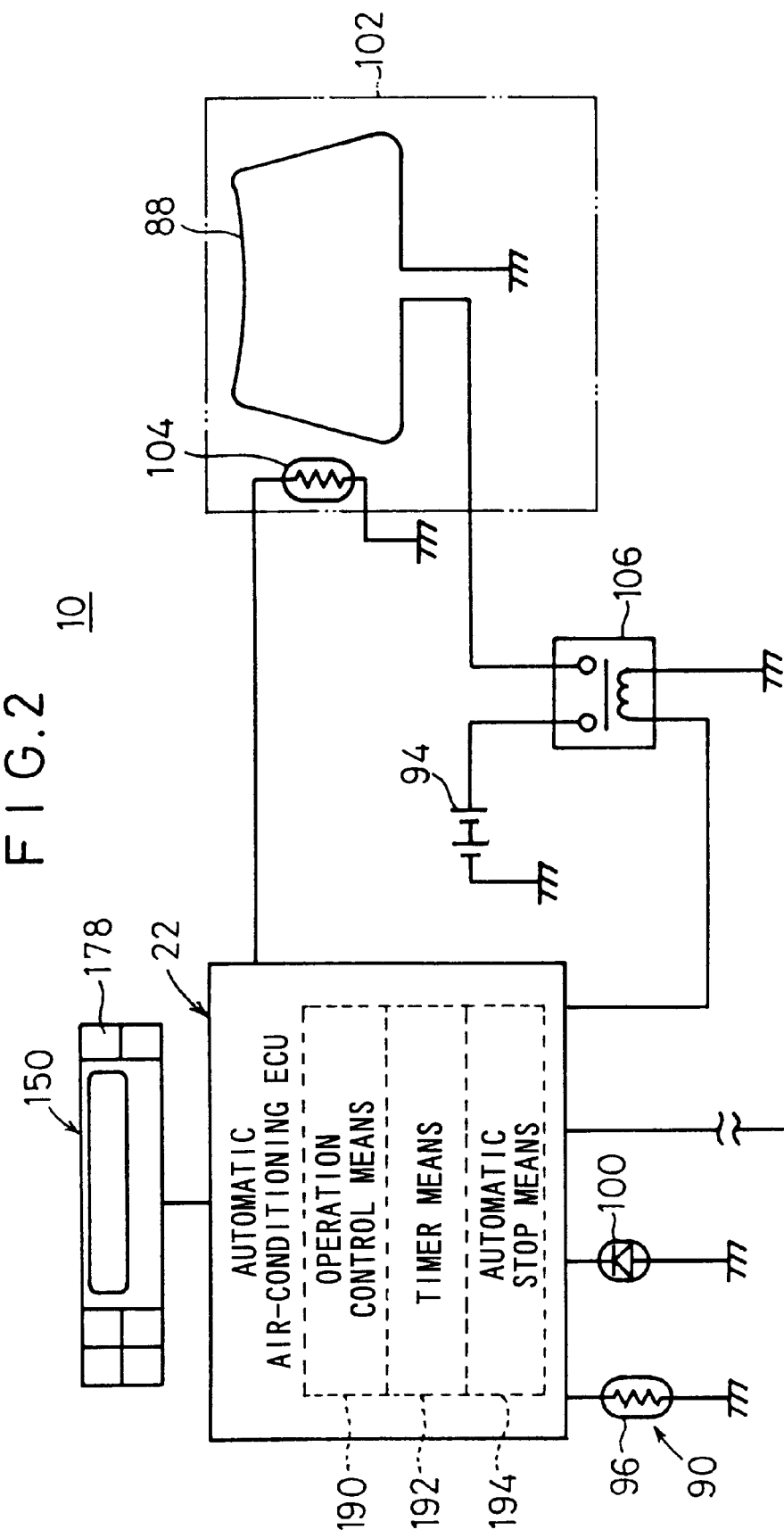
FIG. 2 is a circuit diagram of the control apparatus.

As shown in FIGS. 1 and 2, the environmental condition input unit 90 includes an ambient air temperature sensor 96 for detecting an ambient air temperature $T_{AM}$, a passenger's compartment temperature sensor 98 for detecting a passenger's compartment temperature $T_R$, a sunlight intensity sensor 100 for detecting a sunlight intensity $T_S$ (kcal/h·m$^2$), and a glass temperature sensor 104 for detecting a glass temperature $T_{GR}$ of a windshield glass 102. As shown in FIG. 2, the electric heat-operated defroster 88 is connected to the battery 94 through a relay 106. The relay 106 is switched on and off by the automatic air-conditioning ECU 22.

As shown in FIG. 1, the operating condition input unit 92 includes a water temperature sensor 108 for detecting the temperature $T_W$ of hot water flowing through the heater core 34, an air temperature sensor 110 for detecting the temperature $T_E$ of air discharged from the evaporator 32, a pressure sensor 112 for detecting the pressure of the cooling medium discharged from the compressor 52, a current sensor 114 for detecting a current from the battery 94, and a cooling medium temperature sensor 116 for detecting the temperature of the cooling medium near the exterior heat exchanger 62.

Basically, the automatic air-conditioning ECU 22 can perform a function as a calculating means for calculating a target discharged-air temperature $T_{AO}$ based on inputted environmental conditions including the passenger's compartment temperature $T_R$ and ambient air temperature $T_{AM}$, and a desired temperature setting $T_{SET}$, a function as an operation mode selecting means for selecting one of operation modes including a cooling mode, an air blowing mode, and a heating mode based on the target discharged-air temperature $T_{AO}$, and a function to control the various components included in the entire automatic air-conditioning system 12.

Figure 3:
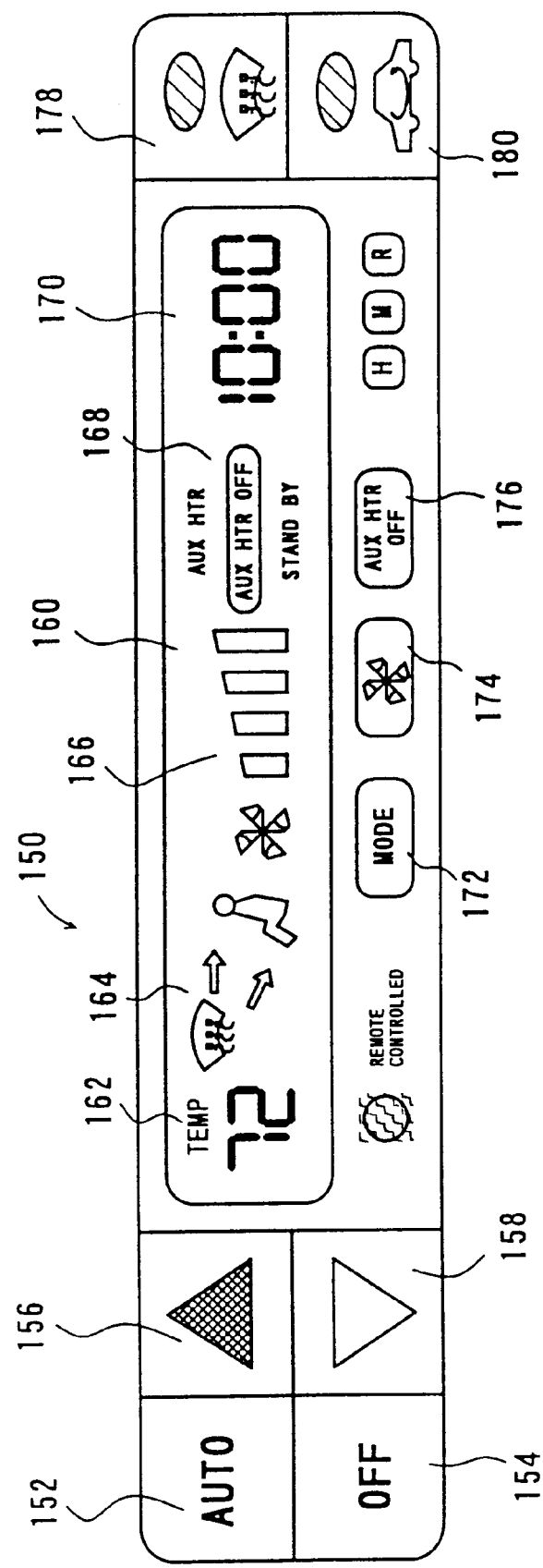
FIG. 3 is a front elevational view of a control panel of the automatic air-conditioning system.

To the automatic air-conditioning ECU 22, there is connected a control panel 150 which, as shown in FIG. 3, has an "AUTO" switch 152 for starting to energize the automatic air-conditioning system 12, an "OFF" switch 154 for turning off the entire operation of the automatic air-conditioning system 12, and temperature increasing and lowering switches 156, 158 disposed respectively adjacent to the "AUTO" switch 152 and the "OFF" switch 154 which are disposed at upper and lower positions at the left end of the control panel 150 as shown in FIG. 3.

The control panel 150 also has a longitudinally elongate liquid crystal display unit 160 disposed substantially centrally therein. The liquid crystal display unit 160 includes a temperature display area 162, an outlet mode display area 164, an air flow intensity display area 166, a fuel-combustion heater status display area 168, and a time display area 170. The fuel-combustion heater status display area 168 includes a display message "STAND BY" indicating that the fuel-combustion heater 76 is in the igniting mode or the extinguishing mode other than the combustion ability switching mode.

The control panel 150 also has, beneath the liquid crystal display unit 160, an outlet mode selector switch 172, an air flow intensity selector switch 174, and a fuel-combustion heater stop switch 176. The control panel 150 further includes a defrosting electric heater switch 178 and an air circulation/introduction selector switch 180 which are disposed at upper and lower positions at the right end of the control panel 150.

As shown in FIG. 2, the control apparatus 10 according to the embodiment of the present invention includes a single defroster selector switch 178 for selectively operating any of the air-conditioning defroster only, said electric heat-operated defroster 88 only, or both the air-conditioning defroster and the electric heat-operated defroster 88, the environmental condition input unit 90 for inputting the ambient air temperature $T_{AM}$, the sunlight intensity $T_S$, and the glass temperature $T_{GR}$, and an operation control means 190 for judging whether or not the inputted ambient air temperature $T_{AM}$, the sunlight intensity $T_S$, and the glass temperature $T_{GR}$ are lower than previously set predetermined values (as described later on) to operate the electric heat-operated defroster 88 only when all of the inputted ambient air temperature $T_{AM}$, the sunlight intensity $T_S$, and the glass temperature $T_{GR}$ are lower than the predetermined values.

The operation control means 190 is provided as a function of the automatic air-conditioning ECU 22. The automatic air-conditioning ECU 22 also has functions as a timer means 192 for starting time measurement when the electric heat-operated defroster 88 is operated, and an automatic stop means 194 for stopping the operation of the electric heat-operated defroster 88, i.e., for opening the relay 106 after passage of a predetermined period of time as measured by the timer means 192.

Operation of the automatic air-conditioning system 12 into which the control apparatus 10 constructed as described above is incorporated will be described below.

When the defroster selector switch 178 is pressed, each of the actuators is in the operation status as shown in Table 1.

TABLE 1

| Mode of operation | Solenoid-operated valve | | | Water | Air-mixing |
| | 58 | 60 | 66 | pump 74 | damper 36 |
|---|---|---|---|---|---|
| (1) Cooling (with exterior air) | On | Off | Off | Off | Cool |
| (2) Dehumidifying C | On | Off | Off | On | Variable Hot-Cool |
| (3) Dehumidifying E | Off | On-Off | On-Off | On | Hot |
| (4) Heat pump heating (with exterior air) | Off | On | Off | On | Hot |

TABLE 1-continued

| Mode of operation | Solenoid-operated valve | | | Water | Air-mixing |
| | 58 | 60 | 66 | pump 74 | damper 36 |
|---|---|---|---|---|---|
| (5) Fuel-combustion heater-controlled heating (with exterior air) | Off | Off | Off | On | Hot |
| (5)' 5 + cooling with interior air | On | Off | Off | On | Hot |

Figure 4:
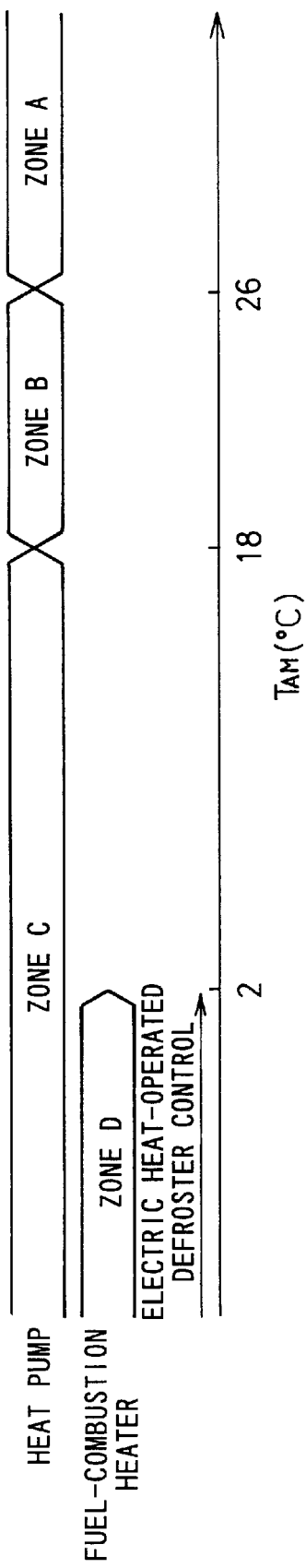
FIG. 4 is a diagram showing the relationship between the ambient air temperature and the mode of operation of the automatic air-conditioning system.

Each of the modes of operation is selected on the basis of the ambient air temperature $T_{AM}$ upon the start of the defroster control. Specifically, as shown in FIG. 4, Zone A to Zone D are set corresponding to the ambient air temperature $T_{AM}$. Table 2 shows contents of the control effected for Zone A to Zone D.

TABLE 2

| | $T_{AM}$ (ambient air temperature) [° C.] | Contents of control | |
| Zone | upon start of DEF control | Initial control | Steady-state control |
|---|---|---|---|
| A | $26 \leq T_{AM}$ | (1) Cooling | (1) Cooling |
| B | $18 \leq T_{AM} < 26$ | (2) Dehumidifying C | (2) Dehumidifying C + air-mixing damper control |
| C | $T_{AM} < 18$ | (3) Dehumidifying E + compressor control | (3) Dehumidifying E (4) Heating |
| D | $T_{AM} \leq 2$ | (5) Heating with fuel-combustion heater | |

Figure 5:
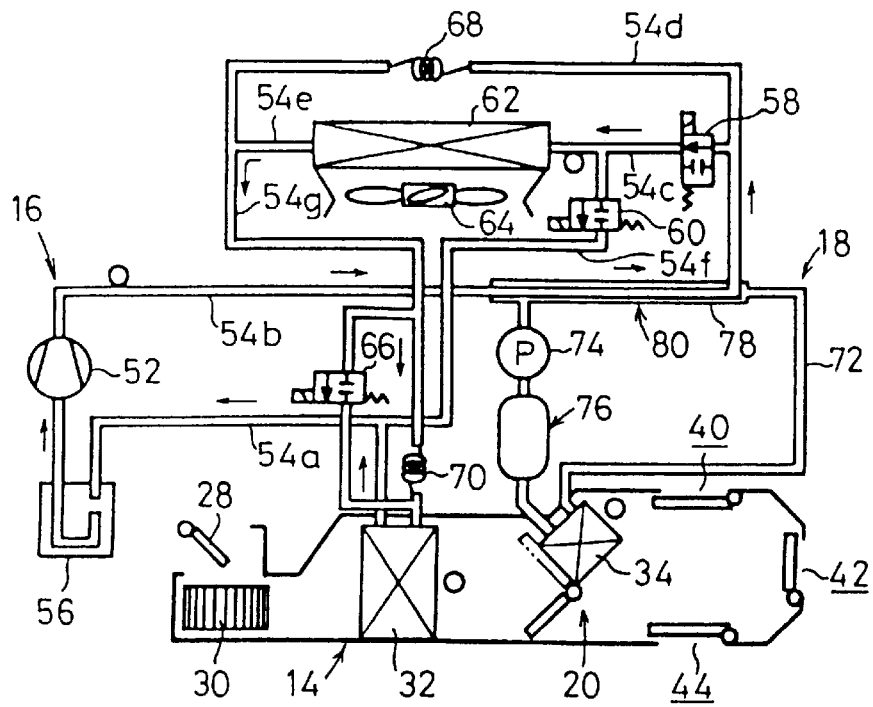
FIG. 5 is a schematic view illustrative of a cooling mode of the automatic air-conditioning system.

At first, the cooling mode effected by the defroster control will be explained. As shown in Table 1 and FIG. 5, the first solenoid-operated valve 58 is open and the second and third solenoid-operated valves 60, 66 are closed. Therefore, the cooling medium discharged from the compressor 52 flows through the cooling medium pipes 54b, 54c, the first solenoid-operated valve 58, the exterior heat exchanger 62, and the cooling medium pipe 54b into the second capillary tube 70, and then it flows through the evaporator 32 into the cooling medium pipe 54a, from which the cooling medium flows through the accumulator 56 back to the compressor 52.

Therefore, the high-temperature, high-pressure gas coolant discharged from the compressor 52 is turned to a liquid when the heat thereof is radiated by the exterior heat exchanger 62. The liquid coolant then flows through the second capillary tube 70 in which its pressure is reduced to produce a cooling medium in a gas-liquid phase. This cooling medium is evaporated in the evaporator 32 thereby to cool air that passes through the evaporator 32.

Figure 6:
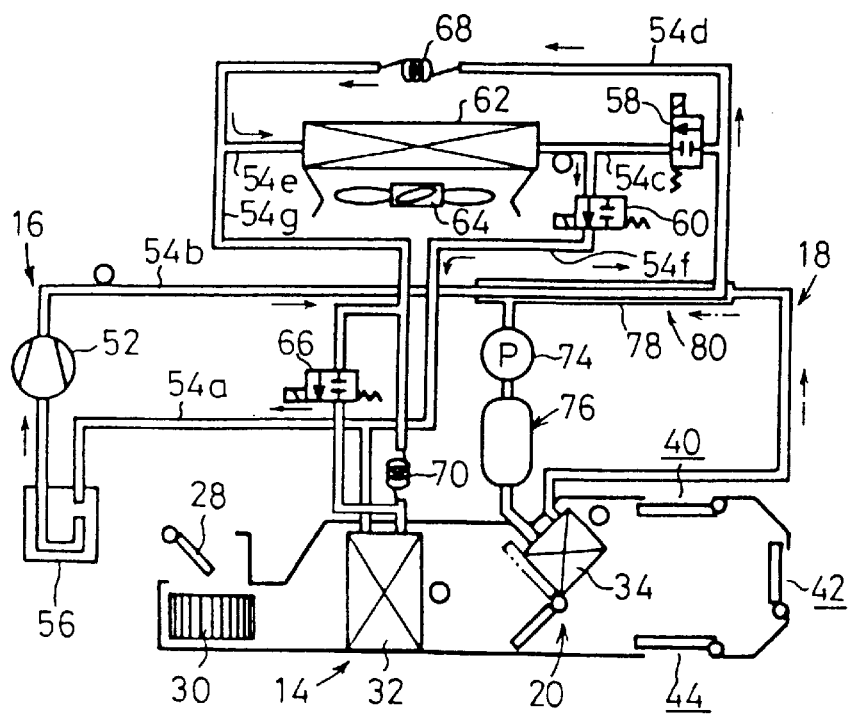
FIG. 6 is a schematic view illustrative of a heating mode of the automatic air-conditioning system.

In the heating mode effected by the defroster control (carried out by a heat pump), as shown in Table 1 and FIG. 6, the first and third solenoid-operated valves 58, 66 are closed, and the second solenoid-operated valve 60 is open. Therefore, the cooling medium discharged from the compressor 52 flows through the cooling medium pipes 54b, 54d into the first capillary tube 68 in which its pressure is reduced to produce a cooling medium in a gas-liquid phase.

The cooling medium passes through the exterior heat exchanger 62 and is evaporated, after which the cooling medium passes through the second solenoid-operated valve 60 and the cooling medium pipes 54f, 54a into the accumulator 56, from which the cooling medium flows back to the compressor 52.

In the heating medium circuit 18, the outer conduit 78 of the double-walled medium heat exchanger 80 is supplied with hot water by operating the water pump 74. Consequently, when the high-temperature, high-pressure cooling medium flows through the cooling medium pipe 54b internally with respect to the outer conduit 78, it heats the hot water in the outer conduit 78. The heated hot water is introduced by the water pump 74 into the heater core 34 for thereby heating air that passes through the heater core 34 to a certain temperature.

Figure 7:
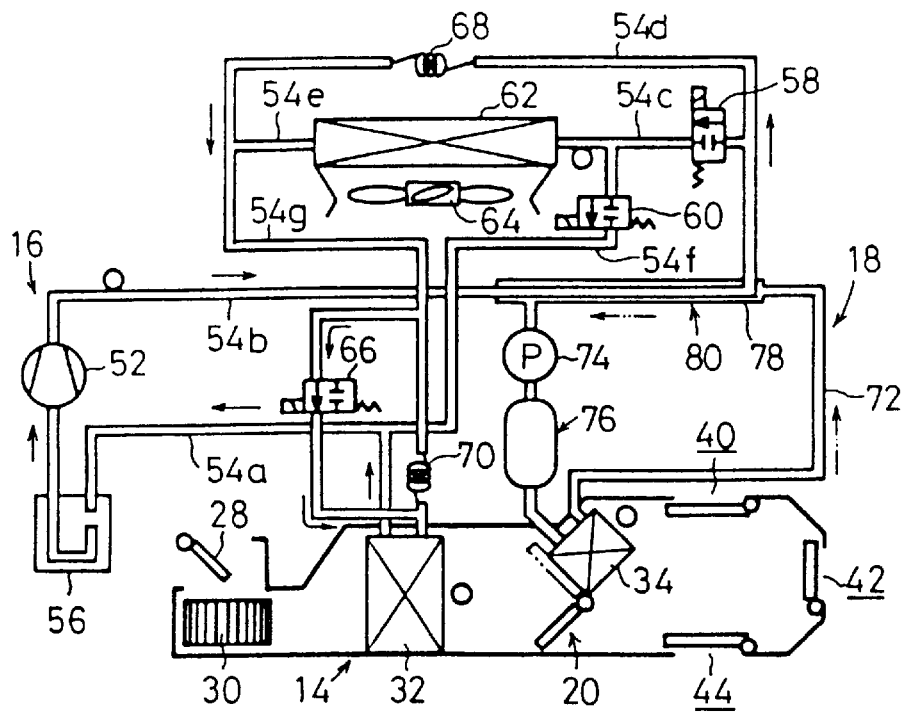
FIG. 7 is a schematic view illustrative of a dehumidifying mode of the automatic air-conditioning system.

In the dehumidifying C mode effected by the defroster control, as shown in Table 1 and FIG. 7, the first and second solenoid-operated valves 58, 60 are closed, and the third solenoid-operated valve 66 is open. Therefore, the cooling medium discharged from the compressor 52 flows through the cooling medium pipes 54b, 54d, the first capillary tube 68, and the cooling medium pipe 54g into third solenoid-operated valve 66. In the first capillary tube 68, the pressure of a cooling medium is reduced so that it is in a gas-liquid phase. The cooling medium then flows to the evaporator 32, it dehumidifies air that passes through the evaporator 32, and thereafter it flows from the cooling medium pipe 54a through the accumulator 56 back to the compressor 52.

Figure 8:
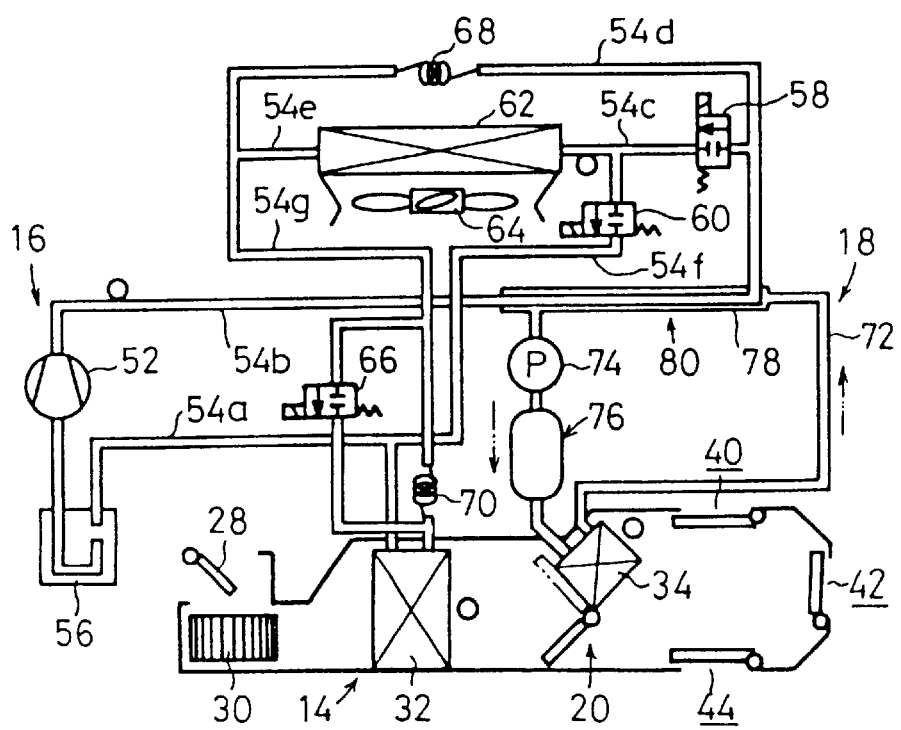
FIG. 8 is a schematic view illustrative of a heating mode carried out by a fuel-combustion heater of the automatic air-conditioning system.

In the heating mode effected by the defroster control (carried out by the fuel-combustion heater), as shown in Table 1 and FIG. 8, the first, second, and third solenoid-operated valves 58, 60, 66 are closed, and the compressor 52 is turned off, so that the automatic air-conditioning system 12 is not operating in an automatic air-conditioning cycle. In this state, the fuel-combustion heater 76 is operated, and the water pump 74 is operated. Accordingly, the hot water, which is heated by the aid of the fuel-combustion heater 76, is introduced into the heater core 34. The air, which passes through the heater core 34, is heated to a predetermined temperature by the hot water.

The operation of the defroster according to the first embodiment of the present invention will be described below with reference to a flow chart shown in FIG. 9.

In order to operate the defroster, at first, the outlet mode is selected to be the "DEF" mode or the "FOOT/DEF" mode by using the outlet mode selector switch 172. The exterior air intake mode is selected by using the air circulation/introduction selector switch 180.

When the defroster selector switch 178 on the control panel 150 is turned on, the automatic air-conditioning ECU 22 reads signals from the ambient air temperature sensor 128, the passenger's compartment temperature sensor 98, and the sunlight intensity sensor 100 of the environmental condition input unit 90 and also signals from the water temperature sensor 108, the air temperature sensor 110, the pressure sensor 112, the current sensor 114, and the cooling medium temperature sensor 116 of the operating condition input unit 92. The automatic air-conditioning ECU 22 also reads a desired temperature setting $T_{SET}$ which has been entered by the passenger by manually pressing the temperature increasing and lowering switches 156, 158 (step ST1).

The routine proceeds to the electric heat-operated defroster control (step ST2). Based on the desired temperature setting $T_{SET}$, and the parameters detected by the environmental condition input unit 90, i.e., the ambient air temperature $T_{AM}$ detected by the ambient air temperature sensor 96, the passenger's compartment temperature $T_R$ detected by the passenger's compartment temperature sensor 98, and the sunlight intensity $T_S$ detected by the sunlight intensity sensor 100, the automatic air-conditioning ECU 22 calculates a target discharged-air temperature $T_{AO}$ for the air to be discharged into the passenger's compartment according to the following equation (1) (step ST3):

$$T_{AO}=K_{SET} \times T_{SET} - K_R \times T_R - K_{AM} \times T_{AM} - K_S \times T_S - C \qquad (1)$$

where $K_{SET}$, $K_R$, $K_{AM}$, $K_S$ represent coefficients (gains) and C a constant.

After the calculation of the target discharged-air temperature $T_{AO}$, the routine proceeds to a step ST4 to select the operation mode. The operation mode is selected as shown in FIG. 4 and Table 2. That is, one of Zone A to Zone D is designated depending on the ambient air temperature $T_{AM}$, and thus the routine selectively proceeds to one of the cooling operation, the dehumidifying C operation, the dehumidifying E operation, and the heating operation carried out by the fuel-combustion heater (steps ST5 to ST8).

When the cooling operation mode is selected (step ST5), the discharged-air temperature is controlled on the basis of the target discharged-air temperature $T_{AO}$ calculated in accordance with the equation (1) (step ST9). The temperature is controlled so that the target discharged-air temperature $T_{AO}$ is equal to the temperature $T_E$ of air detected by the air temperature sensor 110 at the position downstream of the evaporator 32, by controlling the rotation speed of the compressor 52 (step ST10).

When the dehumidifying C operation mode is selected (step ST6), the discharged-air temperature is controlled so that the air temperature $T_E$ is regulated to be the target temperature (step ST11). The opening degree or the angular extent of the air-mixing damper 36 is controlled so that the discharged-air temperature is regulated to be the target discharged-air temperature $T_{AO}$ (step ST12).

When the dehumidifying E operation mode is selected, then the first and second solenoid-operated valves 58, 60 are controlled to be open or closed, and the dehumidifying operation and the heating operation by the heat pump are performed. Thus, the discharged-air temperature is controlled to be the target discharged-air temperature $T_{AO}$ (step ST13). Further, the rotation speed of the compressor 52 is controlled (step ST14).

When the heating operation mode with the fuel-combustion heater is selected (step ST8), the degree of combustion effected by the fuel-combustion heater 76 is controlled continuously or in a stepless manner, for example, in a range of 3000 kcal/h to 6000 kcal/h. The discharged-air temperature is controlled to be the target discharged-air temperature $T_{AO}$ (step ST15).

Figure 10:
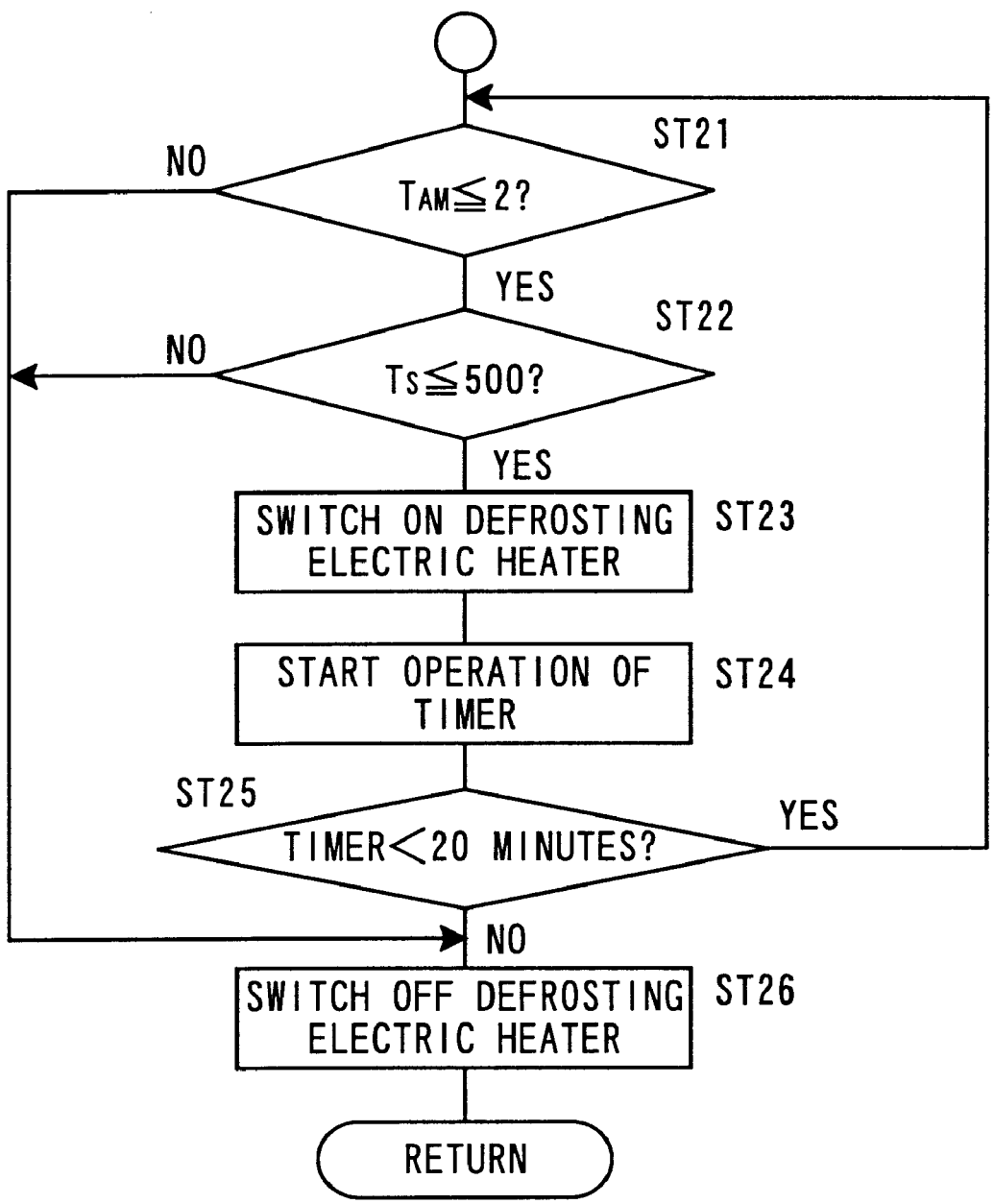
FIG. 10 is a flowchart of a subroutine of electric heat-operated defroster control used in the method shown in FIG. 9.

The electric heat-operated defroster control in the step ST2 is performed as illustrated in a subroutine shown in FIG. 10. At first, it is judged whether or not the inputted ambient air temperature $T_{AM}$ is lower than a predetermined value, i.e., 2° C. When the ambient air temperature $T_{AM}$ is lower than 2° C. (YES in a step ST21), the subroutine proceeds to a step ST22 to judge whether or not the inputted sunlight intensity $T_S$ is lower than a predetermined value, i.e., 500 kcal/h·m². If it is judged that the sunlight intensity $T_S$ is not more than 500 kcal/h·m² (YES in the step ST22), then the electric heat-operated defroster 88 is switched on (step ST23), and the operation of the timer is started (step ST24).

That is, as shown in FIG. 2, the operation control means 190, which is the function of the automatic air-conditioning ECU 22, closes the relay 106 to supply the electric energy from the battery 94 to the electric heat-operated defroster 88 only when it is judged that the ambient air temperature $T_{AM}$ is not more than 2° C. and the sunlight intensity $T_S$ is not more than 500 kcal/h·m². Simultaneously, the timer means 192 starts operation of the timer. After a predetermined period of time, i.e., 20 minutes is measured, (NO in a step ST25), the relay 106 is opened by the aid of the automatic stop means 194, and the electric heat-operated defroster 88 is switched off (step ST26).

In the first embodiment, it is unnecessary to provide individual selector switches respectively for the air-conditioning defroster disposed to supply the temperature-controlled and humidity-controlled air through the duct 14 and discharge the air against the windshield glass 102 from the defrosting outlet 40, and the electric heat-operated defroster 88 embedded in the windshield glass 102. The system of the present invention includes only the single defroster selector switch 178.

Therefore, when the defogging (operation for ensuring the frontward view) for the windshield glass 102 is performed, it is unnecessary for the passenger to selectively operate the air-conditioning defroster and the electric heat-operated defroster 88. It is enough for the passenger to merely turn on the defroster selector switch 178. Accordingly, the present invention is effective in that the operability of the defroster is simplified all at once.

In the first embodiment, the electric heat-operated defroster 88 is operated only when both of the ambient air temperature $T_{AM}$ and the sunlight intensity $T_S$ are lower than the predetermined values. Under the conditions other than the above, only the air-conditioning defroster is operated. Therefore, the defogging for the windshield glass 102 is performed efficiently and reliably, and the windshield glass 102 can be effectively protected.

Further, the electric heat-operated defroster 88 is not operated continuously for a period not less than the predetermined period of time (20 minutes), and hence the protective function for the windshield glass 102 is effected more reliably. The operations described above are performed by the aid of the operation control means 190, the timer means 192, and the automatic stop means 194 as the functions of the automatic air-conditioning ECU 22. Therefore, the system of the present invention is not complicated as compared with the conventional automatic air-conditioning system.

Figure 11:
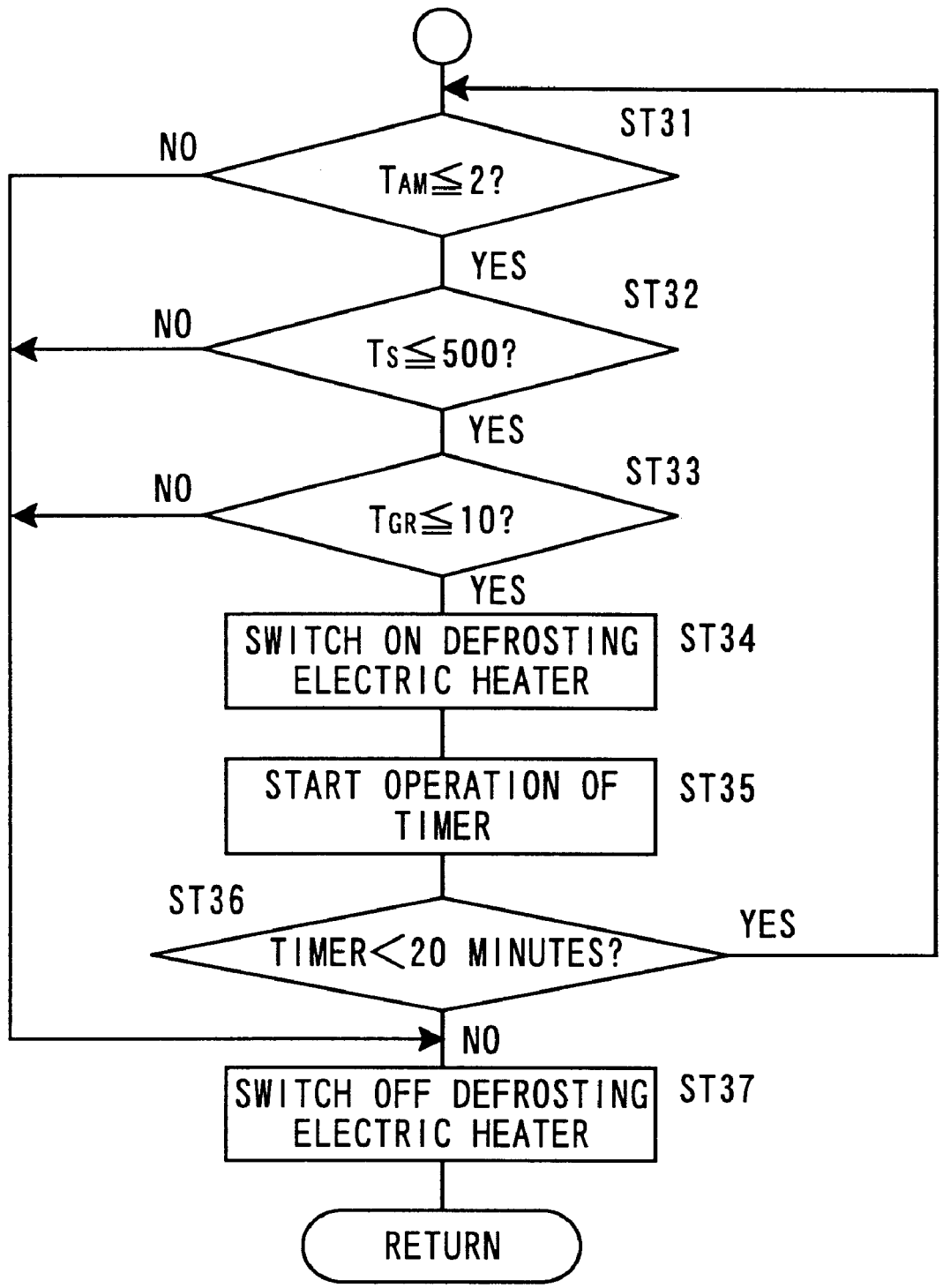
FIG. 11 is a flowchart of a subroutine of electric heat-operated defroster control used in the defroster control method according to a second embodiment of the present invention.

FIG. 11 shows a subroutine for the electric heat-operated defroster control performed in the defroster control method according to a second embodiment of the present invention.

Figure 9:
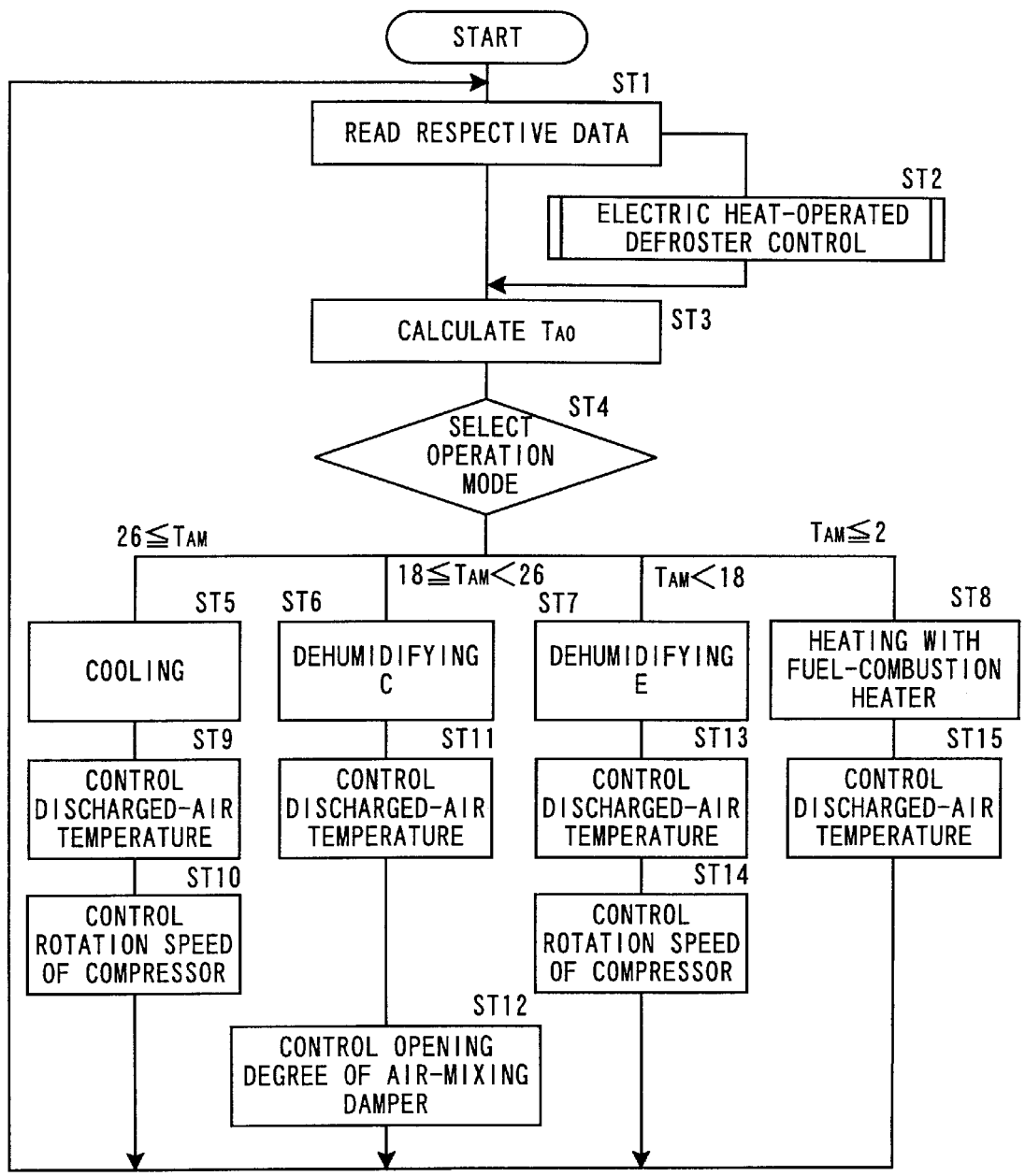
FIG. 9 is a flowchart of a defroster control method according to a first embodiment of the present invention.

In the second embodiment, the glass temperature $T_{GR}$ of the windshield glass 102 is read by the automatic air-conditioning ECU 22 in the step ST1 shown in FIG. 9 by the aid of the glass temperature sensor 104 of the environmental condition input unit 90.

As shown in FIG. 11, it is judged whether or not the ambient air temperature $T_{AM}$ and the sunlight intensity $T_S$ are lower than predetermined values, and it is judged whether or not the glass temperature $T_{GR}$ is lower than 10° C. as a predetermined value (step ST31 to step ST33). The subroutine proceeds to a step ST34 to operate the electric heat-operated defroster 88 only when it is judged that all of the ambient air temperature $T_{AM}$, the sunlight intensity $T_S$, and the glass temperature $T_{GR}$ are lower than the predetermined values. The timer starts time measurement (step ST35) simultaneously with the operation of the electric heat-operated defroster 88. The electric heat-operated defroster 88 is automatically stopped after passage of a predetermined period of measured time (step ST36 and step ST37).

As described above, in the second embodiment, the glass temperature $T_{GR}$ of the windshield glass 102 is detected in addition to the ambient air temperature $T_{AM}$ and the sunlight intensity $T_S$ to perform the control such that the electric heat-operated defroster 88 is not operated when the glass temperature $T_{GR}$ is not less than 10° C. Accordingly, it is possible to obtain the same effect as that obtained in the first embodiment. Further, the second embodiment is advantageous in that the electric heat-operated defroster 88 is not operated when the environmental temperature for the windshield glass 102 is high, and thus it is possible to reduce, for example, occurrence of distortion and breakage of the windshield glass 102 as less as possible.

As described above, in the method and the apparatus for controlling the vehicular defroster according to the present invention, when the single switch for operating the defroster is turned on, then the environmental conditions at least including the ambient air temperature and the sunlight intensity are inputted, and the environmental conditions are compared with the previously set predetermined values respectively to automatically select one of the operation of only the air-conditioning defroster and the operation of both of the air-conditioning defroster and the electric heat-operated defroster. Therefore, it is enough for the passenger to merely operate the single switch to be turned on/off. Thus, the defogging for the windshield glass can be performed efficiently and reliably by means of the extremely simple operation.

What is claimed is:

1. A method for controlling a vehicular defroster for operating and controlling an air-conditioning defroster for discharging air-conditioned air against a windshield glass to perform defogging, and an electric heat-operated defroster having a heating wire embedded in said windshield glass to perform defogging therewith, said method comprising the steps of:

inputting environmental conditions including at least an ambient air temperature and a sunlight intensity when a single defroster selector switch for operating said defroster is switched on;

judging whether or not said inputted ambient air temperature and said sunlight intensity are lower than previously set predetermined values;

operating only said air-conditioning defroster when it is judged that at least one of said inputted ambient air temperature and said sunlight intensity is higher than said predetermined value; and operating said electric heat-operated defroster only when it is judged that both of said inputted ambient air temperature and said sunlight intensity are lower than said predetermined values.

2. The method according to claim 1, further comprising the steps of:

starting time measurement when said electric heat-operated defroster is operated; and automatically stopping said operation of said electric heat-operated defroster after passage of a predetermined period of measured time.

3. The method according to claim 1, wherein a glass temperature of said windshield glass is inputted in addition to said ambient air temperature and said sunlight intensity, and said electric heat-operated defroster is operated only when all of said ambient air temperature, said sunlight intensity, and said glass temperature are lower than said predetermined values.

4. The method according to claim 3, further comprising the steps of:
   starting time measurement when said electric heat-operated defroster is operated; and
   automatically stopping said operation of said electric heat-operated defroster after passage of a predetermined period of measured time.

5. An apparatus for controlling a vehicular defroster for operating and controlling an air-conditioning defroster for discharging air-conditioned air against a windshield glass to perform defogging, and an electric heat-operated defroster having a heating wire embedded in said windshield glass to perform defogging therewith, said apparatus comprising:
   a single defroster selector switch for selectively operating any of said air-conditioning defroster only, said electric heat operated defroster only, or both said air-conditioning defroster and said electric heat-operated defroster;
   an environmental condition input unit for inputting environmental conditions including at least an ambient air temperature and a sunlight intensity; and
   an operation control means for judging whether or not said inputted ambient air temperature and said sunlight intensity are lower than previously set predetermined values, and operating said electric heat-operated defroster only when it is judged that both of said inputted ambient air temperature and said sunlight intensity are lower than said predetermined values.

6. The apparatus according to claim 5, wherein each of said environmental condition input unit and said operation control means is an automatic air-conditioning ECU.

7. The apparatus according to claim 5, further comprising:
   a timer means for starting time measurement when said electric heat-operated defroster is operated; and
   an automatic stop means for stopping said operation of said electric heat-operated defroster after passage of a predetermined period of time measured by said timer means.

8. The apparatus according to claim 5, wherein:
   said environmental condition input unit inputs a glass temperature of said windshield glass in addition to said ambient air temperature and said sunlight intensity; and
   said operation control means operates said electric heat-operated defroster only when all of said ambient air temperature, said sunlight intensity, and said glass temperature are lower than said predetermined values.

9. The apparatus according to claim 8, further comprising:
   a timer means for starting time measurement when said electric heat-operated defroster is operated; and
   an automatic stop means for stopping said operation of said electric heat-operated defroster after passage of a predetermined period of time measured by said timer means.

* * * * *